United States Patent [19]

Itoh

[11] Patent Number: 4,888,755

[45] Date of Patent: Dec. 19, 1989

[54] OPTICAL HEAD FOR RECORDING INFORMATIONS INTO A RECORD MEDIUM AND REPRODUCING THE SAME THEREFROM

[75] Inventor: Masataka Itoh, Tokyo, Japan

[73] Assignee: NEC Corporation, Tokyo, Japan

[21] Appl. No.: 69,083

[22] Filed: Jul. 2, 1987

[30] Foreign Application Priority Data

Jul. 2, 1986 [JP] Japan ............ 61-156403

[51] Int. Cl.[4] ............ G11B 7/135

[52] U.S. Cl. ............ 369/45; 369/46; 369/112

[58] Field of Search ............ 350/167, 168, 169, 170, 350/171, 172, 173; 369/44, 45, 46, 112

[56] References Cited

U.S. PATENT DOCUMENTS

| | | | |
|---|---|---|---|
| 4,309,108 | 1/1982 | Siebert | 356/352 |
| 4,509,830 | 4/1985 | Kato et al. | 350/394 |
| 4,545,651 | 10/1985 | Kato et al. | 350/394 |
| 4,766,582 | 8/1988 | Ando | 369/45 |

FOREIGN PATENT DOCUMENTS

| | | |
|---|---|---|
| 115033 | 2/1985 | Japan . |
| 47238 | 3/1985 | Japan . |
| 113335 | 11/1985 | Japan . |

OTHER PUBLICATIONS

Synthetic Collection of Technologies on an Optical Memory/Photomagnetic Memory, Published on Oct. 31, 1983, by Science Forum Co., Ltd.

*Primary Examiner*—Frank Gonzalez
*Attorney, Agent, or Firm*—Sughrue, Mion, Zinn, Macpeak and Seas

[57] ABSTRACT

An improved optical head comprises such a means as a prism for separating a plurality of light beams deflected from the light path between a plurality of light sources and record medium to pass at least one of the plurality of light beams through one of reflecting planes of the means and to reflect the remaining light beams of the plurality of light beams thereon for the reason why each light axis of the plurality of light beams has a slight slant to others, and the reflecting plane is shaped to have an angle such that the incidence angle of the at least oen of the plurality of light beams is smaller than the critical angle of the means, while the remaining light beams of the plurality of light beams are larger in the incidence angles than the critical angle of the means. The at least one of the plurality of light beams is detected to crrect focusing and tracking errors.

6 Claims, 2 Drawing Sheets

OPTICAL HEAD FOR RECORDING INFORMATIONS INTO A RECORD MEDIUM AND REPRODUCING THE SAME THEREFROM

FIELD OF THE INVENTION

The invention relates to an optical head for recording informations into a record medium and reproducing the same therefrom, and more particularly to an optical head for recording informations into a record medium and reproducing the same therefrom wherein a plurality of light beams emitted from a plurality of light sources are focused on a record medium like an optical disc.

BACKGROUND OF THE INVENTION

Conventional optical heads utilizing a plurality of light beams radiated from a plurality of laser diodes are described in Japanese Patent laid open Nos. 60-47238 (47238/1985), 60-113335 (113335/1985), and 60-115033 (115033/1985) which are laid open on Mar. 14, 1985, and June 19 and 21, 1985 respectively. One of the optical heads comprises three laser diodes from which three light beams each being of p-polarized wave are emitted, collimator lens through which each of the three light beams is made parallel, a polarized beam splitter for passing p-polarized wave therethrough and deflecting s-polarized wave thereby, a quarter-wave plate for conversion between linearly and circularly polarized waves, first focusing lens provided on an actuator to be controlled by a servo system so that the three light beams are focused on a record medium on which three light beam spots, for instance, a pre-beam, recording beam and reproducing beam spots are formed on a tracking line, three photodiode detecting means for detecting the three light beams each light axis having a slight slant to others after being reflected on the record medium, being passed through the quarter-wave plate and being deflected by the polarized beam splitter, and second lens for focusing the three light beams deflected by the polarized beam splitter to the corresponding photodiode means. One of the three photodiode detecting means consists of four divided regions by which one of the three light beams (for instance, corresponding to the reproducing beam spot) is received without being interrupted by a knife edge means provided between the polarized beam splitter and focusing lens. The remaining two photodiode detecting means are positioned on the knife edge means to receive the remaining two light beams (for instance, corresponding to the pre-beam and recording beam spots). The knife edge means may be replaced by a pin hole means. The construction of the optical head described above will be explained in more detail in conjunction with FIGS. 1A and 1B.

In operation, each of the three light beams of p-polarized wave emitted respectively from the three laser diodes is made parallel by the collimator lens and then passed through the polarized beam splitter. The three light beams are converted from p-polarized wave to circularly polarized wave by the quarter-wave plate and then focused on a tracking line of the record medium by the focusing lens to form a pre-beam, recording beam and reproducing beam spots thereon. The three light beams are reflected on the record medium and propagated through the first focusing lens in the opposite direction back to the quarter-wave plate. At the quarter-wave plate, the three light beams are converted from circularly polarized wave to s-polarized wave and then deflected in an approximately orthogonal direction to the light beam path between the laser diodes and record medium. One of the three light beams thus deflected is received through the second focusing lens on the four divided regions of the photodiode detecting means to produce focusing and tracking error signals which are input to the servo system. The actuator is controlled to shift the focusing lens to its positions of the light axis direction and direction orthogonal thereto thereby to correct focusing and tracking errors. The remaining two light beams are received through the second focusing lens by the two corresponding photodiode detecting means on the knife edge. Among the pre-beam, recording beam and reproducing beam spots, the pre-beam spot serves the purpose of finding whether or not a region on a tracking line to be recorded is already recorded, is not clean by the accumulation of dusts, is damaged on its surface and so on, and of detecting the address of tracking line and sector to which the region belongs. The operation of the optical head described above will be also explained later in more detail in conjunction with FIGS. 1A and 1B.

In the conventional optical head, however, it is very difficult to increase the precision in correcting focusing error due to cross talk based upon light leakage among the three light beams even if the cross talk is lowered by some specific means for the reason why the focusing error signal is produced based upon the amount of the light to be received by the two regions which are divided in the four divided regions of the photodiode means by a line orthogonal to a line on which three light beams are positioned.

For the purpose of lowering cross talk among the three light beams in correcting focusing error, a diameter of a pin hole through which one of the three light beams is passed is made smaller to restrict the amount of passing light in a case where the pin hole means is used in place of the knife edge means. As a result, the precision of correcting focusing error is lowered, although the influence of cross talk is lowered for the reason why even the amount of light including focusing error signal is restricted. In order to control the focusing lens in a stabilized manner by the servo system, a diameter of the pin hole must be as ten times as an outer diameter of the passing light beam in a practical use.

On the other hand, if the distance between the laser diodes is made larger to enlarge the interval between the light beams thereby resulting in the lowering of cross talk thereamong, the astigmatism of the focusing lens is increased. Further, if the second focusing lens is selected to have a longer focal length for the same purpose, the construction of an optical head will be larger in its size.

SUMMARY OF THE INVENTION

Accordingly, it is an object of the invention to provide an optical head for recording informations into a record medium and reproducing the same therefrom wherein a focusing lens is controlled with a higher precision by a servo system.

It is a further object of the invention to provide an optical head for recording informations into a record medium and reproducing the same therefrom wherein the influence of cross talk based upon light leakage among a plurality of light beams emitted from a plurality of light sources is decreased.

It is a still further object of the invention to provide an optical head for recording informations into a record medium and reproducing the same therefrom wherein focusing error is corrected with a higher precision without inviting an enlargement of the construction in its size.

According to the invention, an optical head for recording informations into a record medium and reproducing the same therefrom comprises, a plurality of light sources from which a plurality of light beams are emitted, means for focusing said plurality of light beams on a record medium, means for deflecting said plurality of light beams reflected on said record medium in a predetermined direction, each light axis thereof having a slight slant to others, means positioned in said predetermined direction for separating said plurality of light beams deflected by said means for deflecting to pass at least one of said plurality of light beams therethrough and to reflect the remaining light beams of said plurality of light beams, means for detecting said at least one of said plurality of light beams, and means for controlling said means for focusing to correct focusing or tracking error in accordance with signals to be produced in said means for detecting.

BRIEF DESCRIPTION OF THE DRAWINGS

The invention will be explained in more detail in accordance with following drawings wherein.

DESCRIPTION OF THE PREFERRED EMBODIMENT

Figure 1A:
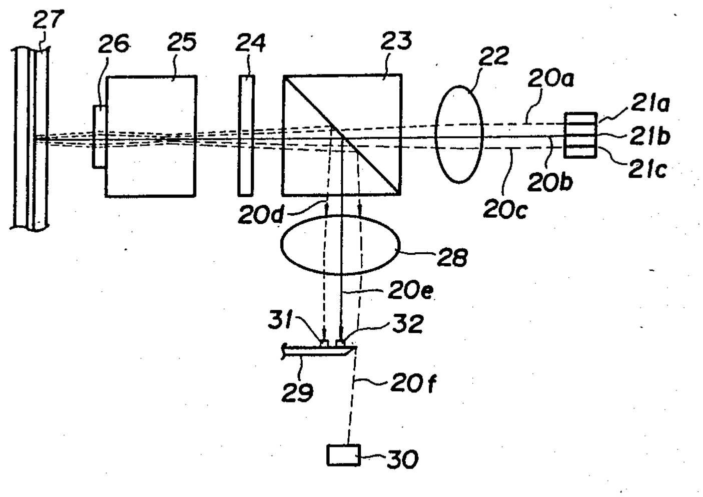
FIG. 1A is an explanatory view showing a conventional optical head.
Figure 1B:
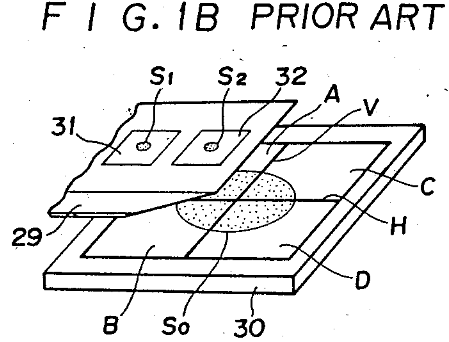
FIG. 1B is an enlarged perspective view illustrating photodiode detecting means in the conventional optical head.

Before describing the preferred embodiment according to the invention, there is shown in FIGS. 1A and 1B one of conventional optical heads which was briefly explained before. The optical head comprises three laser diodes 21*a*, 21*b* and 21*c* from which three light beams 20*a*, 20*b* and 20*c* of p-polarized wave are emitted, a collimator lens 22 through which each of the three light beams 20*a*, 20*b* and 20*c* is made parallel, a polarized beam splitter 23 for passing the three light beams 20*a*, 20*b* and 20*c* of p-polarized wave therethrough and deflecting the three light beams 20*d*, 20*e* and 20*f* of s-polarized wave reflected on a record medium 27, a quarter-wave plate 24 for converting the three light beams 20*a*, 20*b* and 20*c* from p-polarized wave to circularly polarized wave and converting the three light beams 20*d*, 20*e* and 20*f* reflected on the record medium 27 from circularly polarized wave to s-polarized wave, a focusing lens 26 provided on an actuator 25 which is controlled by a servo system (not shown) to correct focusing and tracking errors in focusing the three light beams 20*a*, 20*b* and 20*c* on the record medium 27, a lens 28 for focusing the three light beams 20*d*, 20*e* and 20*f* deflected by the polarized beam splitter 23, a light separating means 29 of a knife edge provided at the vicinity of the focal point of the lens 28 to separate the light beam 20*f* from the remaining two light beams 20*d* and 20*e*, a photodiode detecting means 30 for detecting the light beam 20*f* which consists of four regions A, B, C and D divided by a first line H in the direction of which a pre-beam, recording beam and reproducing beam spots respectively corresponding to the three light beams 20*a*, 20*b* and 20*c* are positioned on the record medium 27 and second line V orthogonal thereto, and two photodiode detecting means 31 and 32 which are provided on the light separating means 29 to detect the two light beams 20*d* and 20*e*.

In operation, each of the three light beams 20*a*, 20*b* and 20*c* of p-polarized wave emitted from the three laser diode 21*a*, 21*b* and 21*c* is made parallel by the collimator lens 22 and then passed through the polarized beam splitter 23. Thereafter, the three light beams 20*a*, 20*b* and 20*c* are converted from p-polarized wave to circularly polarized wave by the quarter wavelength plate 24 and then focused on the record medium 27 to form a pre-beam, recording beam and reproducing beam spots on a tracking line thereof. The three light beams 20*a*, 20*b* and 20*c* are reflected on the record medium 27 and propagated in the opposite direction back to the focusing lens 26. The three light beams 20*d*, 20*e* and 20*f* thus reflected are converted from circularly polarized wave to s-polarized wave by the quarter-wave plate 24 and then deflected in a direction approximately orthogonal to the light beam path between the laser diodes 21*a*, 21*b* and 21*c* and record medium 27 by the polarized beam splitter 23. The light beam 20*f* is received in the form of spot $S_o$ by the photodiode detecting means 30 without being interrupted by the light separating means 29 after being focused by the lens 28. In the photodiode detecting means 30, focusing error F is detected in accordance with the equation (1) based upon the amount of light to be received by the four divided regions A, B, C and D.

$$F \propto [(A+B)-(C+D)] \quad (1)$$

Tracking error T is detected in accordance with the equation (2).

$$T \propto [(A+C)-(B+D)] \quad (2)$$

Signals R for reproducing informations from the record medium 27 are produced in accordance with the equation (3).

$$R \propto (A+B+C+D) \quad (3)$$

The actuator 25 is controlled to correct focusing and tracking errors by the servo system (not shown) in accordance with the equations (1) and (2) so that the focusing lens 26 is adjusted to shift to an appropriate position.

The remaining two light beams 20*d* and 20*e* are received in the form of spots $S_1$ and $S_2$ by the photodiode detecting means 31 and 32 on the light separating means 29 after being focused by the lens 29. The light beam 20*d* corresponds to a pre-beam spot on the record medium 27 so that the condition of a region on a tracking line to be recorded in the following recording sequence can be found beforehand in accordance with signals from the photodiode detecting means 31.

Figure 2A:
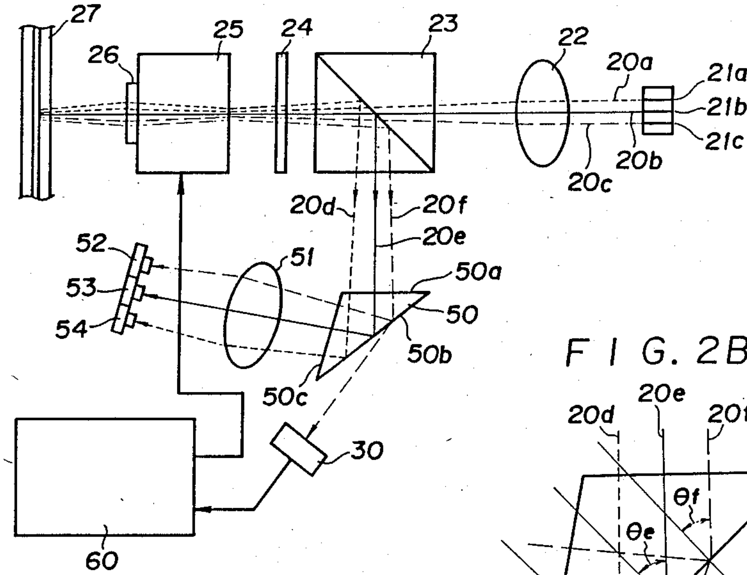
FIG. 2A is an explanatory view showing the first embodiment according to the invention.
Figure 2B:
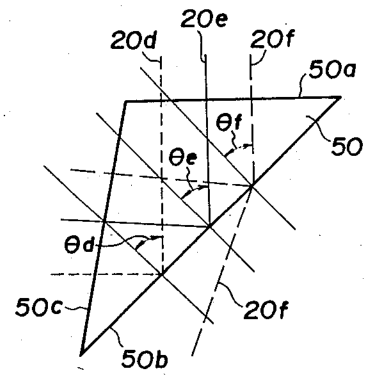
FIG. 2B is an enlarged explanatory view showing a prism in the first embodiment according to the invention.

Next, an optical head in the first embodiment according to the invention will be explained in FIGS. 2A and 2B wherein like parts are indicated by like reference numerals in FIGS. 1A and 1B so that explanations to be repeated are omitted here.

The optical head further comprises a prism 50 having three reflecting planes 50*a*, 50*b* and 50*c*. In the prism 50, the reflecting plane 50*b* is shaped to have an angle such that an incidence angle $\theta f$ of the light beam 20*f* for detecting focusing and tracking errors is smaller than the critical angle of the prism 50, for instance, 42 degrees thereby resulting in the passing of the light beam 20*f* therethrough and that incidence angles $\theta d$ and $\theta e$ of the light beams 20*d* and 20*e* are larger than the critical angle thereby resulting in the total reflection thereof, while the reflecting planes 50*a* and 50*c* are shaped to have respective angles such that all of the three light beams 20*d*, 20*e* and 20*f* pass therethrough without reflection thereof. Behind the reflecting plane 50*b*, there is provided a photodiode detecting means 30 having four divided regions A, B, C and D as described before. The photodiode detecting means 30 is connected to a servo system 60 to control the actuator 25. Further, there is provided a lens 51 for focusing the three light beams 20*d*, 20*e* and 20*f* which are passed through the reflecting plane 50*c* of the prism 50 on photodiode detecting means 52, 53 and 54. Each of the photodiode detecting means 52, 53 and 54 has a photosensitive area as large as the diameter of the respective beam spots and is positioned with the same distance therebetween as the intervals of the light beams 20*d*, 20*e* and 20*f*.

In operation, the three light beams 20*a*, 20*b* and 20*c* of p-polarized wave are emitted from the laser diode 21*a*, 21*b* and 21*c* and then propagated therefrom through the collimator lens 22, polarized beam splitter 23, quarter-wave plate 24 and focusing lens 26 to the record medium 27 as described before. The three light beams 20*d*, 20*e* and 20*f* reflected on the record medium 27, each light axis of which has a slight slant to others, are propagated therefrom through the focusing lens 26 and quarter-wave plate 24 back to the polarized beam splitter 23 so that the three light beams 20*d*, 20*e* and 20*f* are deflected in a direction approximately orthogonal to the light beam path between the laser diodes 21*a*, 21*b* and 21*c* and record medium 27.

The light beam thus deflected 20*f* is passed through the reflecting plane 50*a* of the prism 50 and then passed partly through the reflecting plane 50*b* thereof to be received by the photodiode detecting means 30 of four divided regions A, B, C and D. In the servo system 60, calculations are performed in accordance with the aforementioned equations (1) to (3) so that the focusing and tracking errors are corrected by controlling the actuator 25 carrying the focusing lens 26 to shift to calculated directions by calculated distances. On the other hand, the remaining two light beams 20*d* and 20*e* are passed through the reflecting plane 50*a* of the prism 50 and then reflected totally by the reflecting plane 50*b* so that the two light beams 20*d* and 20*e* are received by the photodiode detecting means 53 and 54 by being focused by the lens 51 after being passed through the reflecting plane 50*c* of the prism 50. Further, the remaining part of the light beam 20*f* which is partly passed through the reflecting plane 50*b* of the prism 50 is reflected thereon and then passed through the reflecting plane 50*c* thereof to be received through the lens 51 by the photodiode detecting means 52.

As clearly understood from the above, it is possible to detect focusing and tracking errors with lower cross talk for the reason why only the light beam 20*f* is passed through the reflecting plane 50*b* of the prism 50 independently of the remaining two light beams 20*d* and 20*e* so that it becomes unnecessary to restrict the amount of passing light, for instance, by such a means as a pin hole utilized in the conventional optical head thereby avoiding the influence of cross talk. Consequently, the tolerance is increased in regard to the moving up or down of the record medium 27 in the direction of the light axis. Further, the photosensitive area of the photodiode detecting means 52, 53 and 54 can be smaller, for instance, down to the same size as the diameter of the light beams 20*d*, 20*e* and 20*f* so that the distances therebetween can be equal to the intervals between the respective two of the three light beams 20*d*, 20*e* and 20*f* as explained before in a case where all of the photosensitive detecting means 52, 53 and 54 are applied to the reproduction of informations for the reason why signals for reproducing the informations are binary. On the other hand, the photosensitive area of the photodiode detecting means 52, 53 and 54 can be larger if light leakage is small.

Figure 3:
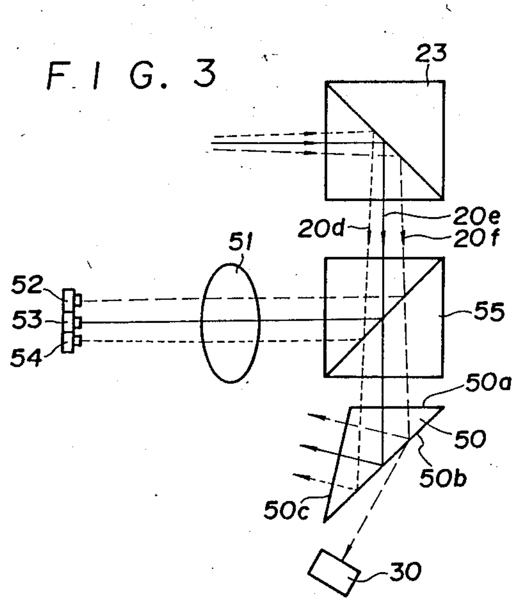
FIG. 3 is an explanatory view showing the second embodiment according to the invention.

In FIG. 3, there is partly shown an optical head in the second embodiment according to the invention. The optical head further comprises a beam splitter 55 provided between the polarized beam splitter 23 and prism 50. The lens 51 for focusing the light beam 20*d*, 20*e* and 20*f* deflected by the beam splitter 55 is positioned between the beam splitter 55 and photodiode detecting means 52, 53 and 54.

In operation, the light beams 20*d*, 20*e* and 20*f* deflected by the polarized beam splitter 23 are divided by the beam splitter 55 so that the deflected light beams thereof are received through the lens 51 by the photodiode detecting means 52, 53 and 54, while only the light beam 20*f* among the three light beams 20*d*, 20*e* and 20*f* is received through the prism 50 by the photodiode detecting means 30.

In the first and second embodiments, photodiode of the photodiode detecting means 30, 52, 53 and 54 may be replaced by such other elements as phototransistor, while the number of the laser diode 21*a*, 21*b* and 21*c* may be more than three. Further, a plurality of light sources are not limited in using laser diode, and a plurality of light sources may be arranged to emit light beams each light axis having a slight slant to others, although the slants thereof were given thereto by the collimator lens.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An optical head for recording informations into a record medium and reproducing the same therefrom comprising, a plurality of light sources from which a plurality of light beams are emitted, means for focusing said plurality of light beams on a record medium, means for deflecting said plurality of light beams reflected from said record medium in a predetermined direction, each light axis thereof having a slight slant to others, means positioned in said predetermined direction for separating said plurality of light beams deflected by said means for deflecting to partially pass at least one of said plurality of light beams therethrough and to reflect the remaining portion of said at least one of said plurality of light beams and the others of said plurality of light beams, means for detecting said portion of said at least one of said plurality of light beams which passes through said means for separating, and means for controlling said means for focusing to correct focusing or tracking error in accordance with signals produced in said means for detecting.

2. An optical head for recording informations into a record medium and reproducing the same therefrom according to claim 1, wherein said means positioned in said predetermined direction is a prism, one of the reflecting planes of said prism being shaped to have an angle such that an incidence angle of said at least one of said plurality of light beams is smaller than the critical angle of said prism, while those of said remaining light beams of said plurality of light beams are larger than said critical angle.

3. An optical head for recording informations into a record medium and reproducing the same therefrom comprising, a plurality of light sources from which a plurality of light beams are emitted, first means for focusing said plurality of light beams on a record medium, means for detecting said plurality of light beams reflected from said record medium in a predetermined direction, each light axis thereof having a slight slant to others, means positioned in said predetermined direction for separating said plurality of light beams deflected by said means for deflecting to partially pass at least one of said plurality of light beams therethrough and to reflect the remaining portion of said at least one of said plurality of light beams and the others of said plurality of light beams, first means for detecting said portion of said at least one of said plurality of light beams which passes through said means for separating, second means for detecting said remaining light beams of said plurality of light beams reflected by said means positioned in said predetermined direction, second means for focusing said remaining light beams of said plurality of light beams on said second means for detecting, and means for controlling said first means for focusing to correct focusing or tracking error in accordance with signals produced in said first means for detecting.

4. An optical head for recording informations into a record medium and reproducing the same therefrom according to claim 3, wherein said means positioned in said predetermined direction is a prism, one of the reflecting planes of said prism being shaped to have an angle such that an incidence angle of said at least one of said plurality of light beams is smaller than the critical angle of said prism, while those of said remaining light beams of said plurality of light beams are larger than said critical angle.

5. An optical head for recording informations into a record medium an reproducing the same therefrom comprising, a plurality of light sources from which a plurality of light beams are emitted, first means for focusing said plurality of light beams on a record medium, means for deflecting said plurality of light beams reflected from said record medium in a predetermined direction, each light axis thereof having a slight slant to others, means positioned in said predetermined direction for dividing said plurality of light beams deflected by said means for deflecting into a plurality of passing light beams and plurality of deflected light beams, means for separating said plurality of passing light beams divided by said means for dividing to partially pass at least one of said plurality of passing light beams therethrough and to reflect the remaining portion of said at least one of said plurality of passing light beams and the others of said plurality of passing light beams, first means for detecting said at least one of said plurality of passing light beams, second means for detecting said plurality of deflected light beams deflected by said means for dividing, second means for focusing said plurality of deflected light beams on said second means for detecting, and means for controlling said first means for focusing to correct focusing or tracking error in accordance with signals produced in said first means for detecting.

6. An optical head for recording information into a record medium and reproducing the same therefrom according to claim 5, wherein said means for separating is a prism, one of the reflecting planes of said prism being shaped to have an angle such that an incidence angle of said at least one of said plurality of passing light beams is smaller than the critical angle of said prism, while those of said remaining light beams of said plurality of passing light beams are larger than said critical angle.

* * * * *